US007981981B2

(12) United States Patent  (10) Patent No.: US 7,981,981 B2
Ajbani et al.  (45) Date of Patent: *Jul. 19, 2011

(54) FLEXIBLE, HYDROCARBON-RESISTANT POLYARYLENESULFIDE COMPOUNDS AND ARTICLES

(75) Inventors: Manoj Ajbani, Mason, OH (US); Andrew Bernard Auerbach, Livingston, NJ (US)

(73) Assignee: Ticona LLC, Florence, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/281,651

(22) PCT Filed: Mar. 9, 2006

(86) PCT No.: PCT/US2006/008533
§ 371 (c)(1),
(2), (4) Date: Sep. 4, 2008

(87) PCT Pub. No.: WO2007/102827
PCT Pub. Date: Sep. 13, 2007

(65) Prior Publication Data
US 2009/0061134 A1  Mar. 5, 2009

(51) Int. Cl.
C08F 283/00 (2006.01)
C08G 75/00 (2006.01)
C08L 81/00 (2006.01)
C08L 33/18 (2006.01)
C08L 33/14 (2006.01)

(52) U.S. Cl. ........ 525/537; 525/212; 525/238; 525/232; 428/36.4; 428/36.9; 428/405

(58) Field of Classification Search ........... 525/212, 525/537, 238, 232; 428/36.9, 36.4, 405, 428/407
See application file for complete search history.

(56) References Cited

U.S. PATENT DOCUMENTS

| | | | |
|---|---|---|---|
| 3,354,129 A | 11/1967 | Edmonds, Jr. et al. | |
| 3,919,177 A | 11/1975 | Campbell | |
| 4,337,329 A | 6/1982 | Kubo et al. | |
| 4,368,321 A | 1/1983 | Sherk et al. | |
| 4,371,671 A | 2/1983 | Anderson | |
| 4,384,081 A | 5/1983 | Kubo et al. | |
| 4,452,951 A | 6/1984 | Kubo et al. | |
| 4,464,515 A | 8/1984 | Rempel et al. | |
| 4,503,196 A | 3/1985 | Rempel et al. | |
| 4,581,417 A | 4/1986 | Buding et al. | |
| 4,889,893 A | 12/1989 | Kobayashi et al. | |
| 5,006,605 A * | 4/1991 | Mizuno et al. | 525/189 |
| 5,047,465 A * | 9/1991 | Auerbach | 524/504 |
| 5,149,731 A * | 9/1992 | Uota et al. | 524/265 |
| 5,248,730 A * | 9/1993 | Yamao | 525/122 |
| 5,270,305 A | 12/1993 | Palmer | |
| 5,652,287 A * | 7/1997 | Sullivan et al. | 524/262 |
| 5,654,358 A | 8/1997 | Kadoi et al. | |
| 5,830,965 A | 11/1998 | Imaizumi et al. | |
| 5,837,758 A * | 11/1998 | Brown et al. | 524/108 |
| 6,225,416 B1 | 5/2001 | Reil et al. | |
| 6,538,071 B1 | 3/2003 | Fuchs | |
| 6,699,946 B1 * | 3/2004 | Lambla et al. | 525/537 |
| 6,875,517 B2 | 4/2005 | Bosshammer et al. | |
| 2004/0028854 A1 | 2/2004 | Bosshammer et al. | |
| 2005/0067035 A1 * | 3/2005 | Suzuki et al. | 138/137 |
| 2005/0119414 A1 * | 6/2005 | Sasagawa et al. | 525/242 |
| 2005/0208248 A1 * | 9/2005 | Ilo et al. | 428/36.91 |
| 2006/0270793 A1 * | 11/2006 | Tokushige et al. | 525/64 |
| 2007/0292703 A1 * | 12/2007 | Ikuta et al. | 428/494 |
| 2009/0011163 A1 | 1/2009 | Ajbani | |

FOREIGN PATENT DOCUMENTS

| | | |
|---|---|---|
| DE | 2539132 A1 | 3/1977 |
| DE | 3046008 A1 | 9/1981 |
| DE | 3046251 A1 | 9/1981 |
| DE | 3227650 A1 | 3/1983 |
| DE | 3329974 A1 | 2/1985 |
| EP | 0111412 A1 | 6/1984 |
| EP | 0435024 A2 | 7/1991 |
| EP | 0435024 A3 | 7/1991 |
| FR | 2540503 A1 | 8/1984 |
| WO | WO 2005/026262 * | 4/2005 |

OTHER PUBLICATIONS

Severe et al, J.Appl. Polymer Science, v.78, 1521-1529, 2000.*
Search Report for PCT/US2006/008533 dated Jul. 14, 2006, 1 page.
International Preliminary Report on Patentability dated Sep. 9, 2008, 4 pages.
Written Opinion for PCT/US2006/008533 dated Jun. 12, 2006, 3 pages.

* cited by examiner

Primary Examiner — Vasu Jagannathan
Assistant Examiner — Irina Krylova
(74) Attorney, Agent, or Firm — Dority & Manning, P.A.

(57) ABSTRACT

Disclosed are polyarylene sulfide compounds and melt-processed shapes therefrom in the form of extruded profiles, tubings, pipes, fibers, monofilaments and films. Embodiments especially adapted from the invention are elongated spooled tubings exhibiting a smooth surface texture, spoolability and chemical resistance. The compounds contain polyarylene sulfide, a highly saturated, hydrogenated (if applicable) nitrile copolymer; and an organofunctional silane. The compounds exhibit spherical microdomains of the nitrile copolymer in diameters ranging from 0.1 μm-100 μm.

19 Claims, 2 Drawing Sheets

FLEXIBLE, HYDROCARBON-RESISTANT POLYARYLENESULFIDE COMPOUNDS AND ARTICLES

CROSS REFERENCE TO RELATED APPLFCATIONS

This application is the United States national stage entry of International Patent Application Number PCT/US2006/008533 having an International Publication Number WO 2007/102827 having an International Filing Date of Mar. 9, 2006.

FIELD OF INVENTION

The scope of the field is polyarylene sulfide thermoplastic compositions and melt-processed shapes therefrom in the form of extruded profiles, tubings, pipes, fibers, monofilaments and films, especially spoolable tubing.

BACKGROUND OF THE INVENTION

Known properties of polyarylene sulfide (PAS), e.g., polyphenylene sulfide (PPS) include excellent solvent resistance, chemical resistance, heat resistance, tensile strength, and stiffness, however PAS has a characteristic low elongation at yield and ultimate elongation at break. PAS is often further compounded with glass and mineral for increasing the strength and stiffness. In one embodiment of PAS, PPS is highly rigid and not suitable for forming flexible extruded piping for aggressive fuel or chemical media transport applications without further modification. Among the known impact modifiers potentially suitable for improving the impact strength of PPS, difficulties can be encountered due to relatively high temperatures required to melt-process PPS.

EP 0 435024 discloses use of hydrogenated nitrile rubber for impact modification of PPS, however only moderate improvements are seen. It would be desirable to obtain further improvement in notched Izod impact strength and higher elongation at break.

U.S. Pat. No. 5,270,305 discloses an impact modified polyarylene sulfide comprising 60-99 parts by weight of a polyarylenesulfide, and 40-1 parts by weight of a polyorganosiloxane graft copolymer (B) prepared by grafting a vinyl monomer on a polyorganosiloxane rubber having a degree of swelling in a range of 3-50 measured using toluene as a solvent.

U.S. Pat. No. 4,889,893 discloses a two-component PPS composition that contains an olefinic copolymer containing 60 to 99.5% of an α-olefin and 0.5 to 40% by weight of a glycidyl ester of an α,β-unsaturated carboxylic acid, e.g., ethylene-glycidyl methacrylate. The olefinic nature of the modifier makes it somewhat susceptible to chemical attack, particularly at relatively high continuous use temperatures. At usage levels above wt. 20% in mixture with PPS, ethylene-glycidyl methacrylate modifier, at high temperatures tends to self-associate and causes surface blemishes or imperfections or gels in extrudates. Such blemishes are more visible when the PPS compound is not further modified with fillers and reinforcing fibers.

U.S. Pat. No. 6,889,719 discloses a multilayer pipe for liquid antifreeze transport that has the inner layer made of resin material having a PPS resin that may optionally contain 20 to 40% by weight of a softening material from ethylene-glycidyl methacrylate (EGMA) and ethylene-propylene copolymers. Since the modifiers are polyolefin based, such a composition has limitations for use in fuel transport under processing temperatures of elevated temperatures. Also, the EGMA based elastomer has a tendency to self associate under PPS processing conditions.

The use of elongated metal tubing in oil and gas wells instead of a string of interconnected tubing sections is widespread. Thermoplastic tubing has the potential to reduce cost and weight but is not without its drawbacks. For an elongated tubing to be coiled on a reel it must be relatively thin-walled and of a relatively small diameter for working over wells and convey chemicals transported through the tubing down hole quickly and inexpensively. It would be desirable to obtain the combination of low degree of swelling in chemical media, increased elongation at break and impact strength to allow for the extrusion of tubing which can be spooled and unspooled without damaging the tubing itself. Objects of the invention include providing thermoplastic PAS compositions that when formed into elongated conduits, are capable of carrying corrosive fluids over a long service life without causing corrosion.

A specific object of the invention is to provide PAS compounds having a balance in elongation at break and impact strength, without compromising much of the inherent chemical resistance of PAS and yet provide extruded spoolable tubings therefrom for transporting chemical fluids. The extruded tubings must additionally exhibit a smooth surface. The aforementioned improvements heretofore have not been shown in PAS compounds presently.

SUMMARY OF THE INVENTION

In one aspect the invention is directed to extrudates exhibiting a smooth surface texture, comprising PAS, a highly saturated nitrile copolymer and an organofunctional silane, which compound exhibits a combined elongation at break of 9-150%, and notched Izod impact strength of 9-80 kJ/m$^2$.

In a preferred aspect, there is provided a composition, of 100 wt. % comprising the following three essential components: from 70-95 wt. % of PAS, such as PPS; from 5-30 wt. % of a highly saturated nitrile copolymer; and 0.1-2% by wt. of an organofunctional silane. The conventionally melt-processed composition is characterized by spherical micro domains of the nitrile copolymer of from 0.1 μm-100 μm in diameter.

In another aspect, the invention is directed to elongated spoolable tubings (or pipes) exhibiting a smooth surface texture, 100 wt. % comprising from 70-95 wt. % PAS, preferably PPS, 5-30 wt. % of hydrogenated diene nitrile copolymer; and 0.1-2% by wt. of an organofunctional silane, the composition exhibiting spherical micro domains of diene nitrile copolymer of a diameter in the range of from 0.1 μm-100 μm.

DETAILED DESCRIPTION

Figure 1:
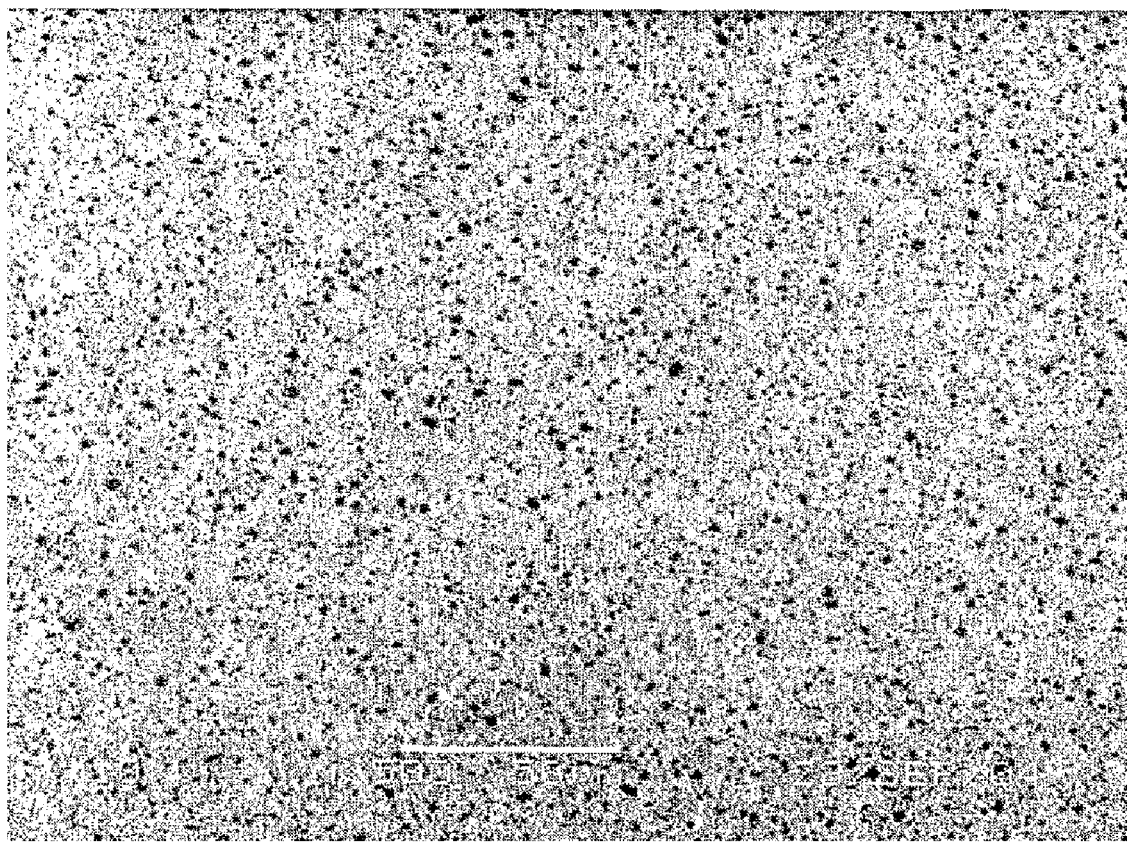
FIG. 1 is a SEM/BEI micrograph of the embodiment of Example 6, using 10KV acceleration voltage and 25-27 Pa air pressure, at 500×, showing spherical micro domains nitrile copolymer particles (b) seen as dark specs in a diameter range of submicron (0.1 μm) to 100 μm.

The PAS resin of the present compounds comprises a major amount (>50% composition) of the repeating unit —(Ar—

S)—(wherein Ar is an arylene group). Examples of the arylene group which may be used include a p-phenylene group, an m-phenylene group, an o-phenylene group, a substituted phenylene group, a p,p'-diphenylenesulfone group, a p,p'-biphenylene group, a p,p'-diphenylene ether group, a p,p'-diphenylene carbonyl group and a naphthalene group. PAS in the form of polyphenylene sulfide is particularly useful in this invention. Polyarylene sulfides useful in the invention include polyarylene thioethers containing repeat units of the formula

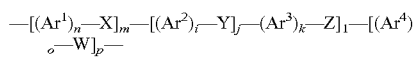

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from —$SO_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide typically includes at least 30 mol %, particularly at least 50 mol % and more particularly at least 70 mol % arylene sulfide (—S—) units. Preferably the polyarylene sulfide polymer includes at least 85 mol % sulfide linkages attached directly to two aromatic rings. Thermoplastic PPS used herein includes semi-linear, branched, or slightly crosslinked versions of thermoplastic PPS. Processes for manufacturing semi-linear PPS are described in U.S. Pat. Nos. 3,354,129, 3,919,177, 4,371,671, and 4,368,321. The PPS resin may be acid-washed or non-acid washed. Examples of PPS resins are provided in U.S. Pat. Nos. 4,889,893 and 5,654,358. The variation in washing may allow adjusting the compatibility of PPS with the modifiers and tailoring the desired properties of the modified PPS compounds.

The highly saturated nitrile copolymer used herein is embodied in the form of a nitrile-olefin copolymer, or terpolymer, etc, and exhibits a glass transition temperature of 0° C. and lower. The term copolymer collectively refers to a polymer comprising at least two comonomers, inclusive of terpolymers, tetrapolymers, etc. The term highly saturated means absent C═C bonds and inclusive of embodiments based on a diolefin (diene) and nitrile wherein a degree of hydrogenation is present, based on the C═C double bonds originating from the diene, of at least 75%. Further comonomers other than nitrile and olefin can be present. The preferred highly saturated nitrile copolymer is a diene nitrile having the above level of unsaturation removed by hydrogenation. The hydrogenated diene nitrile copolymer can alternatively be characterized by a conventional quantitative Iodine index test value. A suitable hydrogenated diene nitrile copolymer is one having an Iodine index ranging from 20 to 120, preferably an Iodine index of from 20 to 80, and most preferably an Iodine index from 20 to 50, as measured by uptake of a volume of hydrogen according the known test procedures. The highly saturated nitrile copolymer may alternatively consist of α-olefin copolymer component, e.g., ethylene-propylene with nitrile-group comonomer.

The highly saturated nitrile copolymer may be non-functional, i.e., with no pendant reactive functional groups other than C═C groups, or there may be a minor proportion of reactive, functional groups present. Functional groups may be provided for instance at from 0.5 wt. %-20 wt. % on total monomer weights from a comonomer containing at least one functional group. Examples of known functional groups from copolymerizable comonomers include comonomers containing carboxylic, anhydride, epoxy, phosphoric, sulfonic, sulfenate, sulfinate, hydroxy, epoxy, isocyanate, amine, and oxazoline groups. Incorporation of functional groups may also be made by graft-addition reactions, acid-base interactions; and hydrolysis reactions, all of which are known. A preferred grafting method is by graft-addition. An example highly saturated, functionalized nitrile copolymer comprises a minor amount (<50 wt. % each in terms of the total wt. of nitrile copolymer) of repeating units of an ethylenically unsaturated dicarboxylic acid monoalkyl ester monomer.

Specific examples of α-β-ethylenically unsaturated nitrile monomers include acrylonitrile, methacrylonitrile and α-chloroacrylonitrile. Acrylonitrile is especially preferable. The content of α,β-ethylenically unsaturated nitrile monomer units in the highly nitrile copolymer is preferably in the range of 10% to 60% by weight, more preferably 15% to 55% by weight and especially preferably 20% to 50% by weight.

Alpha-olefin monomers other than dienes which can be employed as the olefinic component of highly saturated nitrile copolymer include those containing from 2 to 12 carbon atoms, and, as specific examples are ethylene, propylene, 1-butene, 4-methyl-1-pentene, 1-hexene and 1-octene, and mixtures thereof.

Diene monomer is contained in the preferred nitrile copolymer of the highly saturated diene-nitrile copolymers. These dienes include the conjugated diene monomers having at least four carbon atoms such as 1,3-butene, isoprene, 2,3-dimethyl-1,3-butadiene and 1,3-pentadiene; and non-conjugated diene monomers preferably having 5 to 12 carbon atoms such as 1,4-pentadiene and 1,4-hexadiene.

The initial minimum content of diene or α-olefin monomer units in the highly saturated nitrile copolymer is preferably 25%, and more preferably 45% by weight of total of repeating units. The maximum diene or α-olefin content is 80% by weight, more preferably 75 wt. %. Hydrogenation of diene nitrile copolymers is well-known. See for example, DE-A 2,539,132, DE-A 3,046,008, DE-A 3,046,251, DE-A 3,227,650, DE-A 3,329,974, EP-A 111,412, FR-B 2,540,503. The diene-nitrile copolymer preferred herein comprises a diene as the α-olefin and has a degree of hydrogenation, based on the C═C double bonds originating from the diene, of at least 75%, preferably of at least 95%, in particular of at least 98%. The degree of hydrogenation is determined by NMR spectroscopy and IR spectroscopy.

Specific examples of other ethylenic unsaturated comonomers other than olefin and nitrile monomers optionally incporporated into the highly saturated nitrile copolymer in minor fraction (<50 wt. %) in relation to the total monomers include aromatic vinyl monomers such as styrene, α-methylstyrene and vinylpyridine; fluorine-containing vinyl monomers such as fluoroethyl vinyl ether, fluoropropyl vinyl ether, difluoroethylene and tetrafluoroethylene; and fluorine-containing aromatic vinyl monomers such as o-trifluoromethylstyrene and vinyl pentafluorobenzoate, and the like.

Specific examples of optional copolymerizable monomers containing stability-enhancing effects in the highly saturated nitrile copolymer (b) include 4-(4-anilinophenyl)acrylamide, N-(4-anilinophenyl)methacrylamide, N-(4-anilinophenyl) cinnamamide, N-(4-anilinophenyl)crotonamide, N-phenyl-4-(3-vinylbenzyloxy)aniline and N-phenyl-4-(4-vinylbenzyloxy)aniline.

The highly saturated nitrile copolymer preferred in the present invention has a Mooney® viscosity according to ASTM D 1646 [given in Mooney units ML(1+4), 100° C.] in the range of 15 to 200, more preferably 30 to 150 ML (1+4) and especially preferably 45 to 100 ML(1+4). When the Mooney viscosity is substantially below the preferred Mooney range, poorer impact strength and chemical resistance results in the PAS composition. When the Mooney viscosity is substantially above the preferred Mooney range, the copolymer tends to form relatively larger diameter domains within the PAS thermoplastic, and/or elongation at yield or break is reduced.

The degree of crosslinking of the highly saturated nitrile copolymer is not critical, in that an uncrosslinked highly saturated nitrile copolymer is suitable or one in which there is a degree of crosslinking, such as-received, or resulting from additives included which cause the crosslinking to occur during melt-processing with PAS. Known methods of crosslinking highly saturated nitrile copolymer include the use of polyamines, peroxides, zinc diacrylates/acrylate mixtures, and the like. The degree of crosslinking refers to the gel content in an extraction testing in toluene or THF or a mixture of solvents. The % gel content may be 0-100%, more typically up to 50% in the resulting PAS compound according to the invention. ZSC HNBR are conventional forms which are suitable highly saturated nitrile copolymers used herein, and comprise a hydrogenated nitrile copolymer, a diacrylate and a zinc salt of diacrylate, such as disclosed in U.S. Pat. No. 6,538,071. Peroxides may also be present that tend to crosslink the nitrile copolymer at elevated temperatures. Examples include dialkyl peroxides, ketal peroxides, aralkyl peroxides, peroxide ethers, peroxide esters. Use amounts of peroxides are from 1 to 10 phr, preferably within the range of 4 to 8 phr, based on rubber. The cross-linking can be effected at the temperatures reached in forming the melt-mixed compounds.

The composition aspect of the invention, being a melt-processed mixture, in terms of wt. % of components, adding to 100 wt. % includes three components. A minimum amount of PAS is 70 wt. %, preferably 81 wt. %. The maximum wt. % of PAS is 95 wt. %, and preferably 98 wt. %. The minimum wt. % of highly saturated nitrile copolymer is 5 wt. %, preferably 8 wt. %. The maximum content of highly saturated nitrile elastomer is 30 wt. %, preferably 18 wt. %. The minimum amount of organofunctional silane is 0.1 wt. %, preferably 0.2 wt. %. The maximum amount of organfunctional silane is 2 wt. %, preferably 1.0 wt. %.

The organofunctional silanes used in the invention is associated at the surface of the highly saturated nitrile copolymer and may chemically bond to the copolymer surface via unknown mechanisms resulting in a surprising refinement in the size and uniformity of shape of the nitrile copolymer dispersed microdomains within the continuous PAS matrix. The organofunctional silanes suitable for use herein can be selected from organofunctional alkoxysilanes, such as aminoalkoxysilanes, epoxyalkoxysilanes, mercaptoalkoxysilanes, vinylalkoxysilanes, and the like. Selection of the organofunctional silane may be made depending on the specific type of highly saturated nitrile copolymer employed. Preferably, the organofunctional silane contains a nucleophile group selected from amino, phenol, mercaptan, and carboxylate, with primary and secondary amines and mercaptan being the preferred; primary and secondary amines being more preferred; and primary amine being most preferred. The organofunctional silane further comprises alkoxy groups or may contain partially neutralized silanol, such as potassium or sodium salts of 3-aminopropyl-silane triol and N-(2-aminoethyl)-3-aminopropyl-silanetriol.

In one embodiment, the organofunctional silane used is an aminoalkyl alkoxysilane. In a specific embodiment, the aminofunctional silane used is a secondary aminoalkyl alkoxysilane. In a preferred embodiment, the amino-functional silane is a phenyl-substituted aminoalkyl alkoxysilane. Examples of aminofunctional silanes which are useful in the present invention include those available under the Silquest® brand. Examples of useful Silquest® amino-functional silanes include Silquest® Y-9669, N-phenyl-gamma-aminopropyltrimethoxysilane, Silquest® A1170, bis-(gamma-trimethoxysilylpropyl)amine, Silquest® A1100, gamma-aminopropyltriethoxysilane, Silquest® A1110, gamma-aminopropyltrimethoxysilane, and Silquest® A1120, N-(beta-aminoethyl)-gamma-aminopropyltrimethoxysilane. The preferred amino-functional silane for use in the present invention is Silquest® Y-9669.

A preferred embodiment of the invention comprises a PAS in the form of PPS, combined with a carboxylated nitrile butadiene copolymer wherein at least 95% of the double bonds from the diene have been hydrogenated, and an organofunctional silane selected from the group consisting of aminopropyltriethoxy silane, aminopropyl trimethoxysilane, aminoethylaminopropyltriethoxysilane, aminoethylaminopropyltrimethoxysilane, 3-aminopropyl triethoxysilane, 3-aminopropyl trimethoxysilane, 3-aminopropylmethyldimethoxysilane or 3-aminopropyl methyl diethoxy silane, N-(2-aminoethyl)-3-aminopropyl trimethoxy silane, N-methyl-3-aminopropyl trimethoxy silane, N-phenyl-3-aminopropyl trimethoxy silane, bis(3-aminopropyl) tetramethoxy and bis(3-aminopropyl) tetraethoxy disiloxane.

The PAS compounds according to the present invention may optionally have 5%-50 wt. %, also 5-30 wt. %, and also 5-10 wt. % of the highly saturated nitrile copolymer substituted with a epoxy group-containing polyolefin (EGP). The co- or ter- or higher EGP polymers may be prepared using glycidyl-functional comonomers with an olefin, further optionally with additional other vinyl esters or (meth)acrylate comonomers. Additional examples of the epoxy group-containing polyolefin include so-called graft products by addition reaction of unsaturated glycidyl group-containing monomers to conventional olefin homopolymers and copolymers using techniques known in the art. Examples of suitable monomers for EGP are the α-olefins including ethylene, propylene, 1-butene, 1-pentene, 3-methyl-1-butene, 1-hexene, 4-methyl-1-petene, 3-methyl-1-pentene, 1-octene, 1-decene, 1-dodecene, 1-tetradecene, 1-hexadecene, 1-octadecene, 1-eicocene, 1-docecene, 1-tetracocene, 1-hexacocene, 1-octacocene, and 1-triacontene. One or more of these α-olefins may be used. Examples of suitable glycidyl groups are provided by esters and ethers of aliphatic glycidyl, such as allylglycidylether, vinylglycidylether, glycidyl maleate and itaconate, glycidyl acrylate and methacrylate, and also alicyclic glycidyl esters and ethers, such as 2-cyclohexene-1-glycidylether, cyclohexene-4,5-diglyxidylcarboxylate, cyclohexene-4-glycidyl carobxylate, 5-norboenene-2-methyl2-glycidyl carboxylate, and endocis-bicyclo(2,2,1)-5-heptene-2,3-diglycidyl dicarboxylate.

Exemplary epoxy group-containing EGP copolymers include ethylene-glycidyl methacrylate copolymer; ethylene-vinyl acetate-glycidyl methacrylate copolymer; ethylene-ethyl acrylate-glycidyl methacrylate copolymer; ethylene-carbon monoxide-glycidyl methacrylate copolymer; ethylene-glycidyl acrylate copolymer; and ethylene-vinyl acetate-glycidyl acrylate copolymer. Ethyleneglycidyl methacrylate copolymer, ethylene-ethyl acrylateglycidyl methacrylate copolymers and ethylene-vinyl acetateglycidyl methacrylate copolymer are preferred. Examples of suitable commercial EGP are the LOTADER® 8840, 8900, or 8920 grades of Arkema Inc.

The present compounds can optionally include other components not adversely affecting the desired properties thereof. Exemplary materials that could be used as additional components would include, without limitation, antimicrobials, pigments, lubricants, antioxidants, stabilizers, surfactants, waxes, flow promoters, solid solvents, particulate fillers, fibrous fillers of the short and long lengths, including continuous reinforcing fibers, and other materials added to enhance properties and processability and these can be employed in conventional amounts. Of the particulate fillers there is mentioned carbon black, silica, quartz powder, glass bead, glass powder, silicates such as calcium silicate, aluminum silicate, kaolin, talc, clay, diatomaceous earth and wollastonite, metal oxides such as iron oxide, titanium oxide, zinc oxide and alumina, metal carbonates such as calcium carbonate and magnesium carbonate, metal sulfates such as calcium sulfate and barium sulfate, silicon carbide, silicon nitride, boron nitride and metal powders.

The reinforcing fibers are not restricted to any particular material. Examples of reinforcing fibers which may be used are glass fiber, carbon fiber, metal fiber, and aromatic polyamide fiber. Tubing made from reinforced compounds the present compounds may be formed using conventional short fiber compounding and extrusion methods, as well as conventional pultrusion methods. Glass fiber rovings used in a pultrusion method, as an example, are glass fiber diameters of from 8 to 25 μm, especially 10-14 μm, with a weight of from 500 to 4,400 g per 1,000 m. The fiber rovings are usually surface-treated with known sizes containing bonding or coupling agents. The amounts of the reinforcing fiber introduced in fiber-reinforced embodiments of the present compounds may be from as low as 5 to as high as 75% by weight.

The compounds according to the invention are capable of being formed into smooth-surfaced extrudates such as elongated (continuous) tubing and fibers. The most preferred combination of smooth surface, elongation, tensile strength, and impact strength are obtained from extrudates comprising 81-98 wt. % polyphenylene sulfide, 8-18 wt. % of highly saturated diene nitrile copolymer and 0.2-1.0% by wt. of aminoalkoxysilane. Substitution of a portion of the highly saturated nitrile, as mentioned, enables further control and predetermination of these physical properties without significant loss of solvent resistance (% mass uptake).

The invention can be embodied into melt-processed shapes other than elongated tubings, including staple fibers, filaments, spun bond, or meltblown fibers, films and co-extrusions. In general, staple, multi-filament, and spunbond fibers formed from the compositions using conventional techniques can have a fineness of about 0.5 to about 100 denier. Meltblown filaments can have a fineness of about 0.001 to about 10.0 denier. The fibers can also be monofilaments, which can have a fineness ranging from about 20 to about 10,000 denier. Where a continuous filament or staple process is employed, it may be desirable to draw the strands in the solid state with conventional drawing equipment, such as, for example, sequential godets operating at differential speeds. Following drawing in the solid state, the continuous filaments may be crimped or texturized and cut into a desirable fiber length, thereby producing staple fiber. The length of the staple fibers generally ranges from about 25 to about 50 millimeters, although the fibers can be longer or shorter as desired.

The PAS compounds according to the invention are prepared, for example, by intensively mixing the constituents at elevated temperature above the meting point of component A, i.e. at 280° C., in equipment with a good mixing action, for example in compounders or extruders, advantageously in kneaders, for example Buss® or Pomini® type or twin screw extruders. A masterbatch can be prepared alternatively wherein a concentrate of highly saturated nitrile, organofunctional silane dispersed in PAS resin is made. Pellets of the concentrate could then be mixed with PPS resin or compound pellets at the time of extruding of profiles, or spinning of fibers. The pulverulent components are usually first mixed mechanically at room temperature and subsequently melt-mixed to a substantially homogeneous consistency and fine dispersion of highly saturated nitrile copolymer particles. Conventional pipe extrusion methods are used to extrude the compounds into elongated tubing. PAS compounds of this invention are especially suitable for fabricating spoolable tubing for transporting well drilling chemicals. The tubings may be single-layered or multi-layered. Typical conventional extrusion or molding processes may be used for forming the tubings. Either single or multi-screw extruders may be used for extrusion of the tubing. A single screw extruder of length to diameter ratio of 24:1 may be used. A temperature setting of 304.4° C. may be used on the various zones of the extruder and temperature in the range of 282° C. to 320° C. may be used in the zones of the die.

EXAMPLES

Examples provided below in Tables 1, 3, and 5 were prepared by melt mixing in a continuous mixing extruder (Haake® or twin-screw) by feeding the ingredients in the feed throat. Temperatures above the melting point of PPS, namely, 280° C. were used to conduct the melt mixing. The extrudates were pelletized and injection molded for obtaining tensile/impact specimens for physical testing. Mass uptake was measured by immersing the specimens in a pressure vessel containing a solvent mixture at 140° C. until the weight gain reached equilibrium. Weight gain is reported below as % mass uptake. The hydrocarbon solvent mixture was 70% heptane, 20% cyclohexane, and 10% toluene. Zetpol® 2000 and 4300 hydrogenated nitrile copolymers available in a bale form were first granulated and partitioned with 5% talc for ease of feeding in the mixing extruders. Compositions given below in Tables 1, 3, and 5 are given in weight %.

TABLE 1

|  | 1* | 2* | 3* | 4* | 5* | 6 |
|---|---|---|---|---|---|---|
| Nipol ® 1401LG[1] | 15 | — | — | 15 | — | — |
| Nipol ® 1411[2] | — | 15 | — | — | 15 | — |
| Zetpol ® 2000[3] | — | — | 15 | — | — | 15 |
| Fortran ® 0214[4] | 84.7 | 84.7 | 84.7 | 84.2 | 84.2 | 84.2 |
| Silquest ® A-1100[5] | — | — | — | 0.5 | 0.5 | 0.5 |
| Glycolube ® P[6] | 0.3 | 0.3 | 0.3 | 0.3 | 0.3 | 0.3 |

[1]Unsaturated or non-hydrogenated nitrile rubber with 41% acrylonitrile content from Zeon Chemical;
[2]Unsaturated or non-hydrogenated nitrile rubber with 38% acrylonitrile content from Zeon Chemicals;
[3]Zetpol ® 2000: hydrogenated nitrile rubber (at least 75% of diene unsaturation hydrogenated) with 36% acrylonitrile content from Zeon Chemicals;
[4]Polyphenylene sulfide resin (PPS), ex. Fortran Industries from Ticona LLC;
[5]γ-amino propyl triethoxysilane, ex. General Electric's Specialty Division;
[6]A pentaerythritol tetrastearate, ex. Lonza.

TABLE 2

|  | 1* | 2* | 3* | 4* | 5* | 6 |
|---|---|---|---|---|---|---|
| Break Stress (MPa) | 47.1 | 47.8 | 47.8 | 45.2 | 49.2 | 46.9 |
| Notched Izod (KJ/m$^2$) | 4.8 | 3.9 | 5.1 | 4.3 | 4.1 | 9.7 |
| Instrumented Impact (J) | 3.1 | 3.2 | 7.3 | 2.8 | 1.9 | 43.1 |

*Comparative examples

Example 6 that contained PPS, hydrogenated nitrile rubber and an aminoalkyl alkoxysilane, had superior impact properties (notched Izod and instrumented impact), when compared with the comparative examples 1-5 that either contained an unsaturated nitrile rubber or a saturated nitrile rubber without amino-silane.

This demonstrates that the organofunctional silane is necessary to achieve improved impact properties when a hydrogenated nitrile rubber is used for impact modification of PPS.

Figure 2:
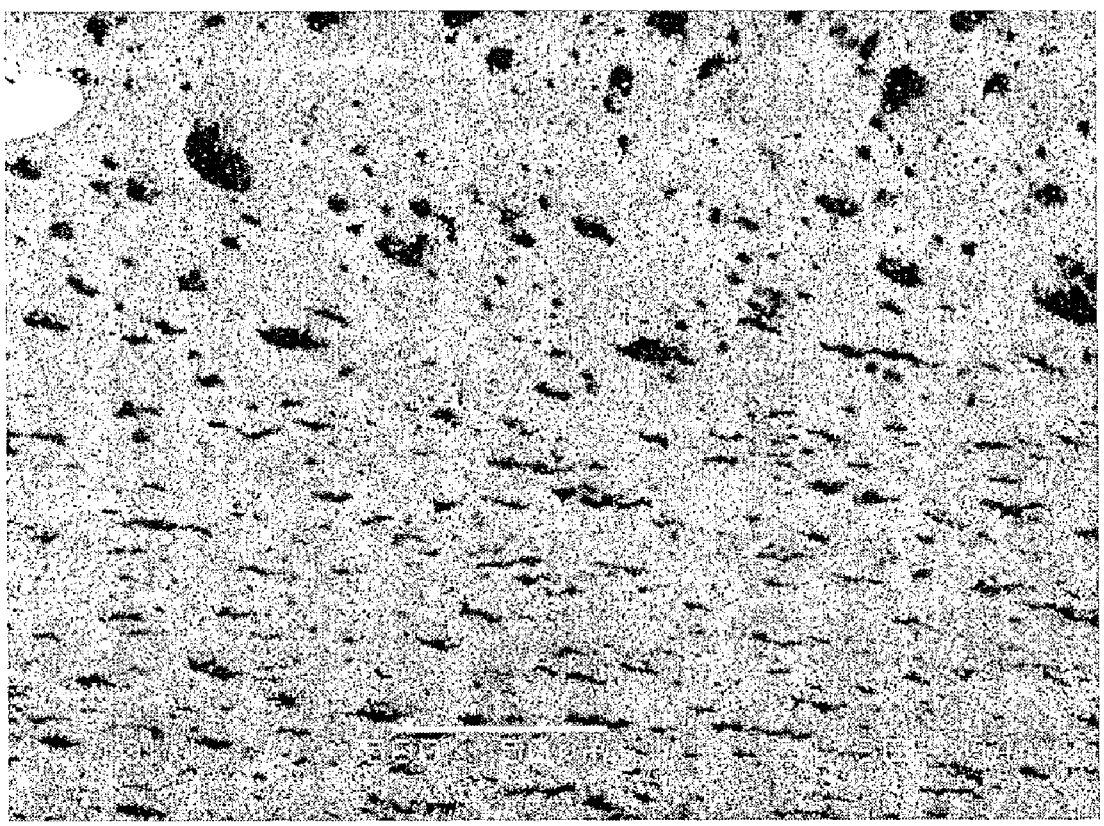
FIG. 2 is a SEM/BEI micrograph of the comparative embodiment of Example 3, using 10KV acceleration voltage and 25-25 Pa air pressure, at 500× showing irregularly-shaped, especially elongated striations of the nitrile copolymer.

Scanning Electron Microscopy in FIG. 1, representing Example 6 exhibit uniform and spherical nitrile copolymer domains in diameters of from sub-μm to around 5 μm. FIG. 2 representative of comparative Example 3 show some spherical nitrile copolymer domains and irregular-shaped larger domains.

TABLE 3

|  | 7* | 8* | 9 | 10 |
|---|---|---|---|---|
| EGP[7] | 15 | 25 | — | 5 |
| Zetpol ® 4300 | — | — | 25 | 20 |
| A-1100 silane | 0.5 | 0.5 | 0.51 | 0.5 |
| Fortron ® 0214 | 84.2 | 74.2 | 74.2 | 74.2 |
| Glycolube ® P | 0.3 | 0.3 | 0.3 | 0.3 |
| Total | 100 | 100 | 100 | 100 |

[7]EGP from Arkema, Inc.

TABLE 4

|  | 7* | 8* | 9 | 10 |
|---|---|---|---|---|
| Break Stress (MPa) | 50.1 | 44.0 | 42.6 | 42.5 |
| Tens. % Elong. @ break | 17.8 | 43.2 | 38.6 | 62.7 |
| Notched Izod (kJ/m$^2$) | 27.1 | 49.6 | 15.9 | 61.7 |
| % Mass Uptake | 7.3 | 14.7 | 9.3 | 10.1 |

*Comparative examples

Examples 9 and 10 that were respectively modified with 25% hydrogenated nitrile rubber and combination of 20 & 5% hydrogenated nitrile rubber & EGP modifiers had the low mass uptake @ equilibrium in the hydrocarbon solvent mixture (70% heptane, 20% cyclohexane, and 10% toluene) when compared with the 25% EGP based comparative Example 8. EGP modifiers alone have been proposed in U.S. Pat. Nos. 488,9893 and 5,654,358 for impact modification of PPS. A combination of hydrogenated nitrile rubber, EGP, and aminofunctional silane provides a good balance of elongation at break (flexibility), impact properties, and lower mass uptake when compared with the equivalent composition that is modified solely with the EGP.

The following Table 5 lists examples that were prepared with non-acid washed PPS grade, Fortron® 0317B1 ex. Fortron Industries from Ticona LLC.

TABLE 5

|  | 11* | 12 |
|---|---|---|
| Glycolube ® P | 0.3 | 0.3 |
| Lotader ® AX8840 | 15 | 3 |
| Dynasylan ® Ameo-pure[8] | — | 0.2 |
| Zetpol ® 4300[9] | — | 12 |
| Fortran ® 0317B1 | 84.2 | 84 |
| Alvinox ® 100[10] | 0.5 | 0.5 |

[8]γ-amino propyl triethoxysilane, ex. Degussa
[9]Hydrogenated nitrile rubber with 19% acrylonitrile, ex. Zeon Chemicals
[10]Alvinox ® 100 is a phenolic antioxidant

TABLE 6

|  | 11* | 12 |
|---|---|---|
| Break Stress (MPa) | 46.3 | 45.6 |
| Tens. Elong. @ Break (%) | 39.6 | 10.9 |
| Notched Izod (kJ/m$^2$) | 17.9 | 10.49 |

*Comparative example

Compositions of examples 11 and 12 were extruded into pipes having an outer diameter of 3.25 inches and a wall thickness of 0.12 inch. A single screw extruder of 2.5 inch (6.3 cm) size with a length to diameter ratio of 24:1 was used in the extrusion of single layer pipe. A temperature setting of 304.4° C. was used on the four extruder zones and temperatures of 304.4° C., 301.6° C., and 282° C., respectively, were used on the three die zones. The following surface textures were obtained.

|  | 11* | 12 |
|---|---|---|
| Pipe surface visual texture | rough | smooth |

Example 12 has good balance of properties and due to the lower EGP and higher nitrile copolymer content, it is expected to provide lower mass uptake than the comparative example 11 in the hydrocarbon solvent mixture. Impact properties can be further improved with higher amino-silane amounts. As can be seen from the illustrated features, smooth-surfaced, extrudates made from PAS, a nitrile copolymer and organofunctional silane exhibit a unique combination of elongation at break of 9-150%, and notched Izod strength of 9-80 kJ/m$^2$. The features above show also that elongated spooled tubing can be made from a compound comprising from 60-98 wt. % PAS, preferably PPS, 5-30 wt. % of hydrogenated diene nitrile copolymer; and 0.1-2% by wt. of an organofunctional silane, where spherical domains of diene nitrile copolymer of a diameter ranging from 0.1 μm-100 μm results in improved elongation, impact strength and is spoolable.

What is claimed is:

1. A resin composition comprising:
   a) 70-98 wt. % of polyphenylene sulfide;
   b) 5-30 wt. % of a highly saturated diene nitrile copolymer having a glass transition temperature of 0°C. or less, wherein the diene nitrile copolymer has a degree of hydrogenation, based on the C=C double bonds originating from the diene, of at least 98%; and
   c) 0.1-2 wt. % of an aminoalkyl alkoxysilane;
   wherein the resin composition exhibits a combined elongation at break of 9-150% and a notched izod impact strength of 9-80 kJ/m$^2$, wherein the composition is melt-processed and the diene nitrile copolymer forms substantially spherical micro domains comprising a diameter from 0.1-100 μm.

2. The resin composition of claim 1, wherein the diene nitrile copolymer further comprises at least a third comonomer.

3. The resin composition of claim 1, wherein the diene nitrile copolymer further comprises functional groups selected from the group consisting of carboxylic groups, anhydride groups, epoxy groups, isocyanate groups, amine groups, oxazoline groups, and combinations thereof.

4. The resin composition of claim 1, wherein the diene nitrile copolymer is a carboxylated nitrile butadiene copolymer wherein at least 95% of the double bonds from the diene have been hydrogenated.

5. The resin composition of claim 1, wherein the diene nitrile copolymer is substantially uncrosslinked.

6. The resin composition of claim 1, wherein the diene nitrite copolymer is substantially crosslinked.

7. The resin composition of claim 1, wherein 5-50 wt. % of the highly saturated diene nitrile copolymer is replaced with an epoxy group-containing polyolefin.

8. The resin composition of claim 7, wherein the epoxy group-containing polyolefin is selected from the group consisting of ethylene-glycidyl methacrylate copolymer, ethylene-vinyl acetate-glycidyl methacrylate copolymer, ethylene-ethyl acrylate-glycidyl methacrylate copolymer, ethylene-carbon monoxide-glycidyl methacrylate copolymer, ethylene-glycidyl acrylate copolymer, ethylene-vinyl acetate-glycidyl acrylate copolymer, and combinations thereof.

9. The resin composition of claim 1, wherein the aminoalkyl alkoxysilane silane is selected from the group consisting of aminopropyltriethoxy silane, aminopropyl trimethoxysilane, aminoethylaminopropyltriethoxysilane, aminoethylaminopropyl trimethoxysilane, 3-aminopropyl triethoxysilane, 3-aminopropyl trimethoxysilane, 3-aminopropylmethyldimethoxysilane, 3-aminopropyl methyl diethoxy silane, N-(2-aminoethyl)-3-aminopropyl trimethoxy silane, N-methyl-3-aminopropyl trimethoxy silane, N-phenyl-3-aminopropyl trimethoxy silane, bis(3-aminopropyl) tetramethoxy disiloxane, bis(3-aminopropyl) tetraethoxy disiloxane, and combinations thereof.

10. The resin composition of claim 1, wherein the polyphenylene sulfide constitutes 81-95 wt. %, the diene nitrile copolymer constitutes 8-18 wt. %, and the aminoalkyl alkoxysilane constitutes 0.2-1.0 wt. %.

11. The resin composition of claim 1, further comprising an additive selected from the group consisting of antimicrobials, pigments, lubricants, antioxidants, stabilizers, surfactants, waxes, flow promoters, solid solvents, particulate filers, fibrous fillers, and combinations thereof.

12. The resin composition of claim 1, wherein the polyphenylene sulfide is acid-washed.

13. The resin composition of claim 1, wherein the polyphenylene sulfide is not acid-washed.

14. A smooth-surfaced, elongated tube comprising the resin composition of claim 1, wherein the tube is spoolable.

15. A smooth-surfaced, elongated fiber comprising the resin composition of claim 1.

16. The fiber of claim 15, wherein the fiber is a staple fiber, multi-filament fiber, or spunbond fiber and comprises a denier of about 0.5 to about 100.

17. The fiber of claim 15, wherein the fiber is a meltblown filament and comprises a denier of about 0.001 to about 10.

18. The fiber of claim 15, wherein the fiber is a monofilament fiber and comprises a denier of about 20 to about 10,000.

19. The resin composition of claim 1, wherein the resin composition exhibits a notched Izod impact strength of 9.7 to 61.7 kJ/m2.

* * * * *